United States Patent
Shibata et al.

(10) Patent No.: US 6,465,725 B1
(45) Date of Patent: Oct. 15, 2002

(54) TRACKING TYPE PHOTOVOLTAIC POWER GENERATOR AND ERROR CORRECTION METHOD OF ITS BUILT-IN CLOCK

(75) Inventors: Masatoshi Shibata; Yukio Suzuki, both of Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/919,578

(22) Filed: Jul. 31, 2001

(51) Int. Cl.[7] ................... H01L 31/042; F24J 2/38; G05D 3/00
(52) U.S. Cl. ............... 136/246; 136/244; 136/291; 250/203.4; 126/573; 126/574; 126/575
(58) Field of Search ................ 136/246, 244, 136/291; 250/203.4; 126/573, 575, 574

(56) References Cited

U.S. PATENT DOCUMENTS

| | | | |
|---|---|---|---|
| 4,031,385 A | * 6/1977 | Zerlaut et al. | ........... 250/203.4 |
| 4,215,410 A | * 7/1980 | Weslow et al. | ................ 700/61 |
| 4,286,581 A | * 9/1981 | Atkinson, Jr. | ................ 126/585 |
| 4,320,288 A | * 3/1982 | Scharlack | ................ 250/203.4 |
| 4,546,756 A | * 10/1985 | Leroy et al. | ................ 126/603 |

FOREIGN PATENT DOCUMENTS

| JP | 2000-196127 A | * 7/2000 |
|---|---|---|
| JP | 2000-223730 A | * 8/2000 |

* cited by examiner

*Primary Examiner*—Alan Diamond
(74) *Attorney, Agent, or Firm*—Carrier, Blackman & Associates, P.C.; Joseph P. Carrier; William D. Blackman

(57) ABSTRACT

A tracking type photovoltaic power generator includes a clock for clocking a time and a sun direction sensor for outputting a signal indicative of a sun direction, a controller which calculates a first time when the sun the sun arrives at a culmination azimuth on the basis of the time clocked by the clock, detects a culmination azimuth on the basis of a difference between a second time when the culmination azimuth is detected and the first time. Accordingly, the generator automatically corrects the error of the time clocked by the clock.

14 Claims, 4 Drawing Sheets

| | |
|---|---|
| CALCULATED CULMINATION TIME | 11:40:30 |
| TIME WHEN POWER GENERATION MODULE IS ORIENTED TO TRUE SOUTH | 11:43:20 |

TRACKING TYPE PHOTOVOLTAIC POWER GENERATOR AND ERROR CORRECTION METHOD OF ITS BUILT-IN CLOCK

BACKGROUND OF THE INVENTION

1. Field of the Invention

The present invention relates to a tracking type photovoltaic power generator and an error correction method of its built-in clock.

2. Description of the Related Art

Conventionally, a tracking type photovoltaic power generator has been well known. This tracking type photovoltaic power generator, as conceptually shown in FIG. 1, has a power generation module 12 supported so as to be rotatably in a direction of an azimuth angle "A" and a direction of an elevation angle "Z". Also, this tracking type photovoltaic power generator has a sun direction sensor rotated together with the power generation module 12, a clock and a controller although they are not shown. A signal obtained from the sun direction sensor for indicating a sun direction is sent to the controller.

This conventional tracking type photovoltaic power generator uses the following two methods to detect the sun direction. In the first method, the sun direction is detected by the calculation based on a position (represented by a longitude and a latitude) at which the tracking type photovoltaic power generator is installed, and a date and a time. In this case, the date and the time are obtained from the clock. In the second method, the sun direction is detected based on a signal from the sun direction sensor.

This conventional tracking type photovoltaic power generator is operated as follows. That is, on an arrival of an operation start time (for example, a time of a sunrise), the power generation module 12 is firstly turned to the sun direction. That is, the controller detects the sun direction by using the first method, and rotates the power generation module 12 to the detected direction.

In the normal operation after that, if the sun is behind a cloud, the first method is used to detect the sun direction at a predetermined time interval. If the sun is not behind the sun, the second method is used to detect the sun direction at the predetermined time interval. Based on those detected results, the power generation module 12 is rotated at the predetermined time interval so that a light reception surface of the power generation module 12 is faced to the sun. Thus, it is controlled such that the light reception surface of the power generation module 12 is always opposite perpendicularly to the sun, namely, the power generation module 12 tracks the sun.

By the way, a quartz oscillation clock similar to a home clock is used as the above-mentioned clock. An error (an oscillation stability) of this clock is 11 ppm (corresponding to one second/day) if an ambient temperature is 10 to 30° C. Also, if the ambient temperature is –40 to 85° C., the error is 150 ppm (13 seconds/day). If it is converted into an annual error, the error becomes 80 minutes/year.

The occurrence of such an error causes the direction of the light reception surface of the power generation module 12 to be deviated from the actual sun direction. For example, the delay of the clock such as two minutes and fifty seconds may cause the following situation. That is, as shown in FIG. 2, although a culmination time (also referred to as "meridian passage time") determined by a calculation is forty minutes thirty seconds past eleven, a time when the light reception surface of the power generation module 12 is turned to a true south in the case of the tracking operation using the sun direction sensor is forty-three minutes twenty seconds past eleven. The excessively large deviation causes the sun to depart from a visual angle of the sun direction sensor, when the control based on the sun direction detected by the first method is switched to the control based on the sun direction detected by the second method. Thus, there may be the case that the tracking is impossible.

This error of the clock can be manually corrected by a person at the position of the installation of the tracking type photovoltaic power generator. However, if the installation position of the tracking type photovoltaic power generator is located at a remote place, various difficulties are brought about.

SUMMARY OF THE INVENTION

Therefore, an object of the present invention is to provide a tracking type photovoltaic power generator that can automatically correct an error of a clock, and an error correction method of its built-in clock.

In order to attain the above-mentioned object, a tracking type photovoltaic power generator according to a first aspect of the present invention comprises a clock for clocking a time, a sun direction sensor and a controller. The sun direction sensor outputs a signal indicative of a sun direction. The controller corrects an error of the time clocked by the clock based on the signal from the sun direction sensor.

In the tracking type photovoltaic power generator according to the first aspect of the present invention, the controller may be composed of a calculating section, a detecting section and a correcting section. The calculating section calculates a first time when the sun arrives at a predetermined azimuth based on the time clocked by the clock. The detecting section detects the predetermined azimuth based on the signal from the sun direction sensor. The correcting section corrects the error of the time clocked by the clock based on a difference between a second time when the detecting section detects the predetermined azimuth and the first time calculated by the calculating section.

In this case, the detecting section can be configured so as to detect the predetermined azimuth based on the signal from the sun direction sensor within a predetermined time period before or after the first time calculated by the calculating section. Also, the correcting section can be configured so as to correct the error of the time clocked by the clock in a time band except the predetermined time period. Moreover, the correcting section can be configured so as to correct the error of the time 6.

An error correction method of its built-in clock in the tracking type photovoltaic power generator according to a second aspect of the present invention includes the steps of: detecting an error of a time clocked by the built-in clock based on a signal from a sun direction sensor; and correcting the error of the time clocked by the built-in clock based on the detected error.

In the error correction method of its built-in clock in the tracking type photovoltaic power generator according to the second aspect of the present invention, the step of detecting the error can be composed so as to include the steps of: calculating a first time when the sun arrives at a predetermined azimuth based on the time clocked by the built-in clock; detecting the predetermined azimuth based on the signal from the sun direction sensor; and detecting the error of the time clocked by the built-in clock based on a difference between a second time when the predetermined azimuth is detected and the calculated first time.

In this case, the correcting step can be configured so as to correct the error of the time clocked by the built-in clock when the difference becomes equal to or greater than a predetermined value.

DESCRIPTION OF THE PREFERRED EMBODIMENT

Now, an embodiment of the present invention will be described below with reference to the attached drawings. It should be noted that, in the following description, as "predetermined azimuth" in the present invention, a culmination azimuth of the sun, that is, the azimuth of the meridian line of the position at which the tracking type photovoltaic power generator is installed is used. However, the predetermined azimuth in the present invention is not limited to the culmination azimuth. Any azimuth may be used.

Figure 1:
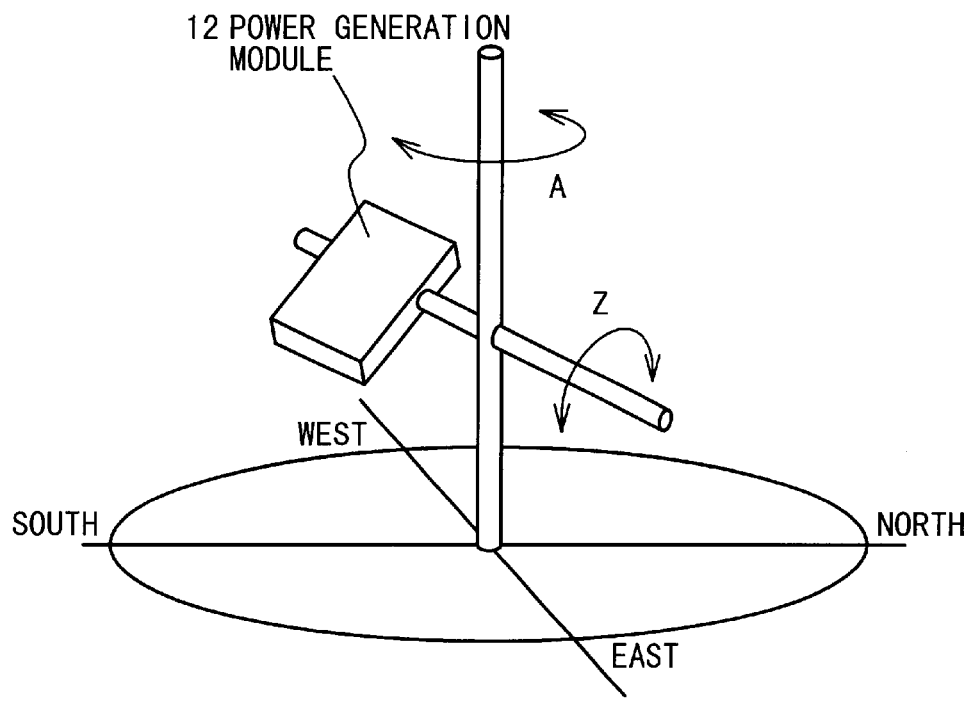
FIG. 1 is a view showing a configuration of a conventional tracking type photovoltaic power generator.
Figure 2:
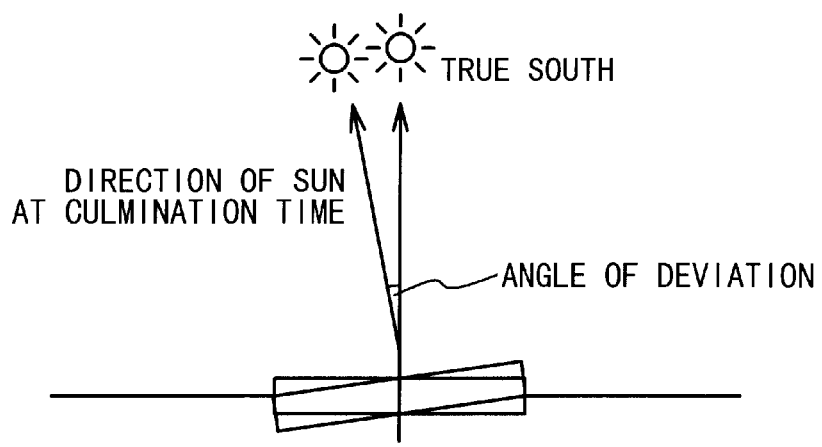
FIG. 2 is a view describing a deviation between a sun direction detected by a calculation and a sun direction detected by a sun direction sensor, which is brought about because of an error of a time clocked by a clock.
Figure 3:
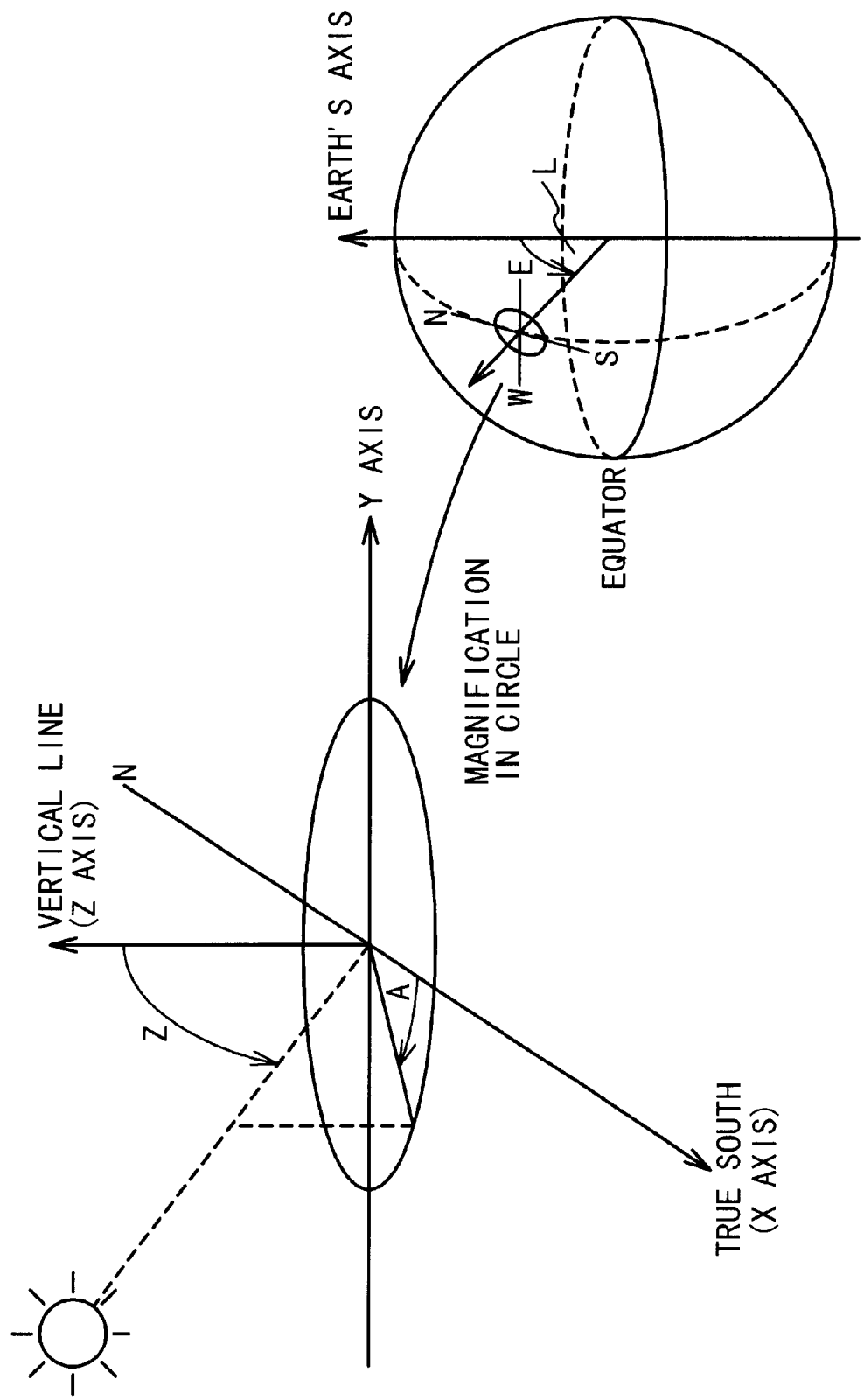
FIG. 3 is a view describing a sun direction at a certain location on an earth surface.

Typically, a sun direction at a certain position on an earth surface can be defined from a zenith angle "Z" (an angle between a sun direction and a vertical line on the position) and an azimuth angle "A" at which a culmination is zero, as shown in FIG. 3. The following equations (1) to (4) are established:

$$\cos Z = \cos D' \times \cos L' + \sin D' \times \sin L' \times \cos H \quad (1)$$

$$\tan A = (\sin D' \times \sin H)/(\sin D' \times \cos L' \times \cos H - \cos D' \times \sin L') \quad (2)$$

$$\cos D' = \sin 23.5° \times \sin((360° \times n \text{ days})/365.25 \text{ days}) \quad (3)$$

$$H = (360°/24 \text{ hours}) \times t \text{ hours} \quad (4)$$

Here, "L'" is a complementary angle of a latitude "L" of an observation position, "n" is the number of elapse days from the spring equinox, and "t" is a time from the culmination time. The negative "t" indicates the morning, and the positive "t" indicates the afternoon.

Here, with reference to the equations (2) and (4), at t=0 (the culmination time), the azimuth angle "A" is always zero (A=0). Thus, in this embodiment, a time when an azimuth angle of a power generation module indicates the culmination is regarded as the culmination time, and a clock is corrected.

Figure 4:
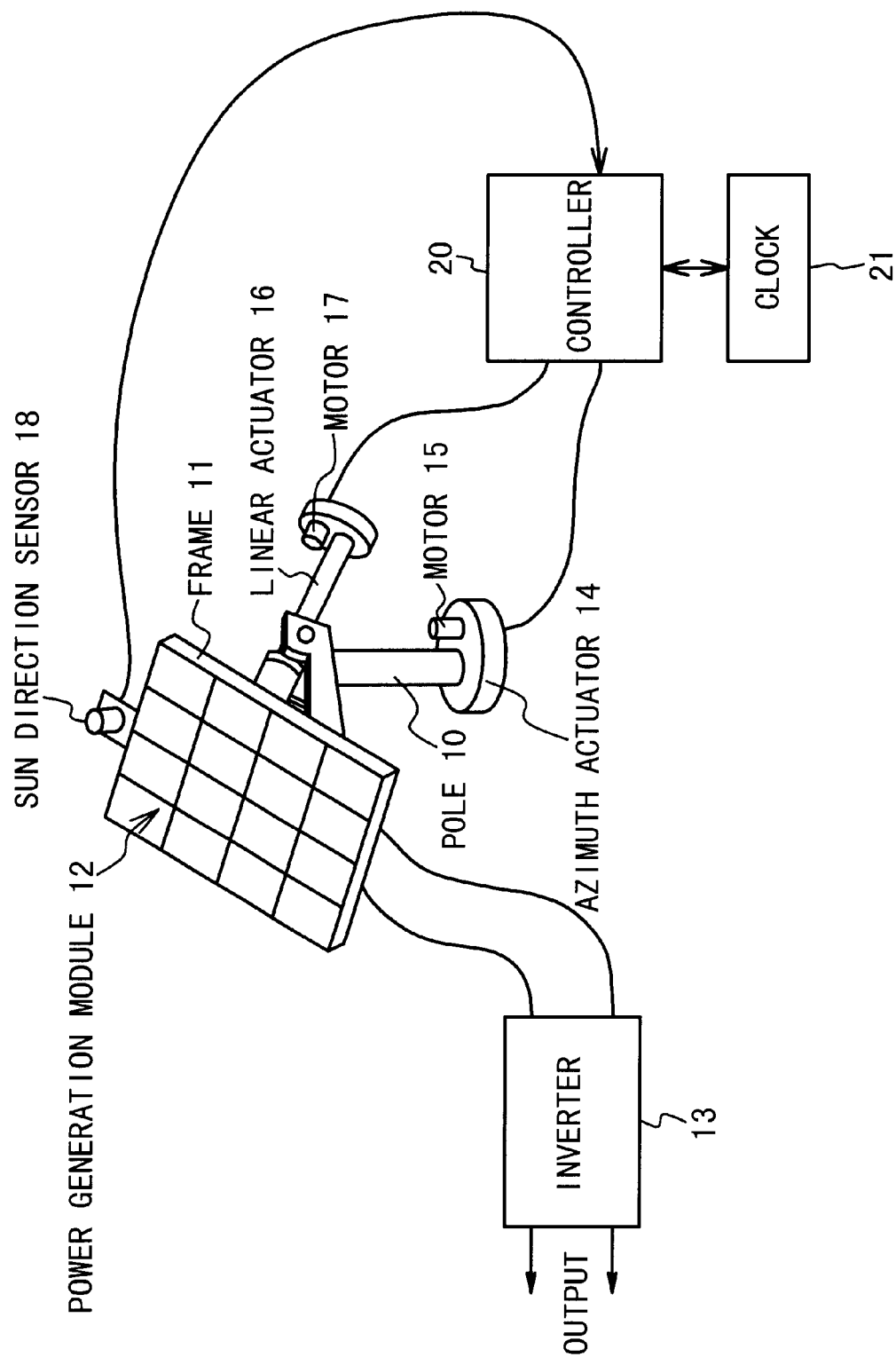
FIG. 4 is a view showing a configuration of a tracking type photovoltaic power generator according to an embodiment of the present invention.

Now, it is specifically described below. FIG. 4 is a view showing a configuration of the tracking type photovoltaic power generator according to the embodiment of the present invention. This tracking type photovoltaic power generator is designed such that a power generation module 12 is mounted in a frame 11 rotatably supported on a pole 10. In this tracking type photovoltaic power generator, an electric power generated by the power generation module 12 is sent through a wire to an inverter 13. The inverter 13 converts an inputted direct current power into an alternating current power. The alternating current power outputted by this inverter 13 is used for consumption.

Also, an azimuth actuator 14 for rotating the entire frame 11 in an azimuth angle direction is mounted at a lower end portion of the pole 10. A motor 15 drives this azimuth actuator 14. Also, a linear actuator 16 for rotating the entire frame 11 in an elevation angle direction is mounted at an upper end portion of the pole 10. A motor 17 drives this linear actuator 16. Each of the motors 15, 17 is constituted by, for example, a stepping motor in which a rotation direction and a rotation amount can be easily controlled.

A sun direction sensor 18 for detecting a sun direction is mounted at a predetermined portion of the frame 11 (an upper portion of FIG. 4). This sun direction sensor 18 outputs a signal for indicating whether or not a vertical line to a light reception surface of the power generation module 12 is deviated from the sun direction. The signal from the sun direction sensor 18 is sent to a controller 20.

The controller 20 contains a CPU (Central Processing Unit), a program memory composed of read only memories (ROMs), and a work memory composed of random access memories (RAMs). The program memory stores a control program to operate the controller 20, fixed data and the like. The work memory is used as a temporary memory when the CPU carries out various processes.

A culmination time register, an error time register, an elevation angle register, an azimuth angle register and the like are defined in the work memory. The culmination time register stores a culmination time calculated based on a time indicated by a clock 21. The error time register stores a difference between the culmination time and a time indicated by the clock 21 when the power generation module 12 is turned to the culmination direction. The elevation angle register stores a current elevation angle of the power generation module 12. Also, the azimuth angle register stores a current azimuth angle of the power generation module 12. The elevation angle register and the azimuth angle register are updated each time the direction of the power generation module 12 is changed.

The clock 21 for clocking a time of a position at which the tracking type photovoltaic power generator is installed is connected to the controller 20. The controller 20 generates tracking control signals for actuating the azimuth actuator 14 and the linear actuator 16, on the basis of time data from the clock 21 and the signal from the sun direction sensor 18, and sends them to the motors 15, 17, respectively.

The motors 15, 17 are rotated in the directions and by the amounts that are indicated by the tracking control signals. Those rotations drive the azimuth actuator 14 and the linear actuator 16, respectively. Accordingly, the power generation module 12 mounted in the frame 11 is rotated in the azimuth angle direction and the elevation angle, respectively. Thus, it is possible to carry out the control so that the light reception surface of the power generation module 12 is always faced to the sun, namely, the tracking control of the sun.

Figure 5:
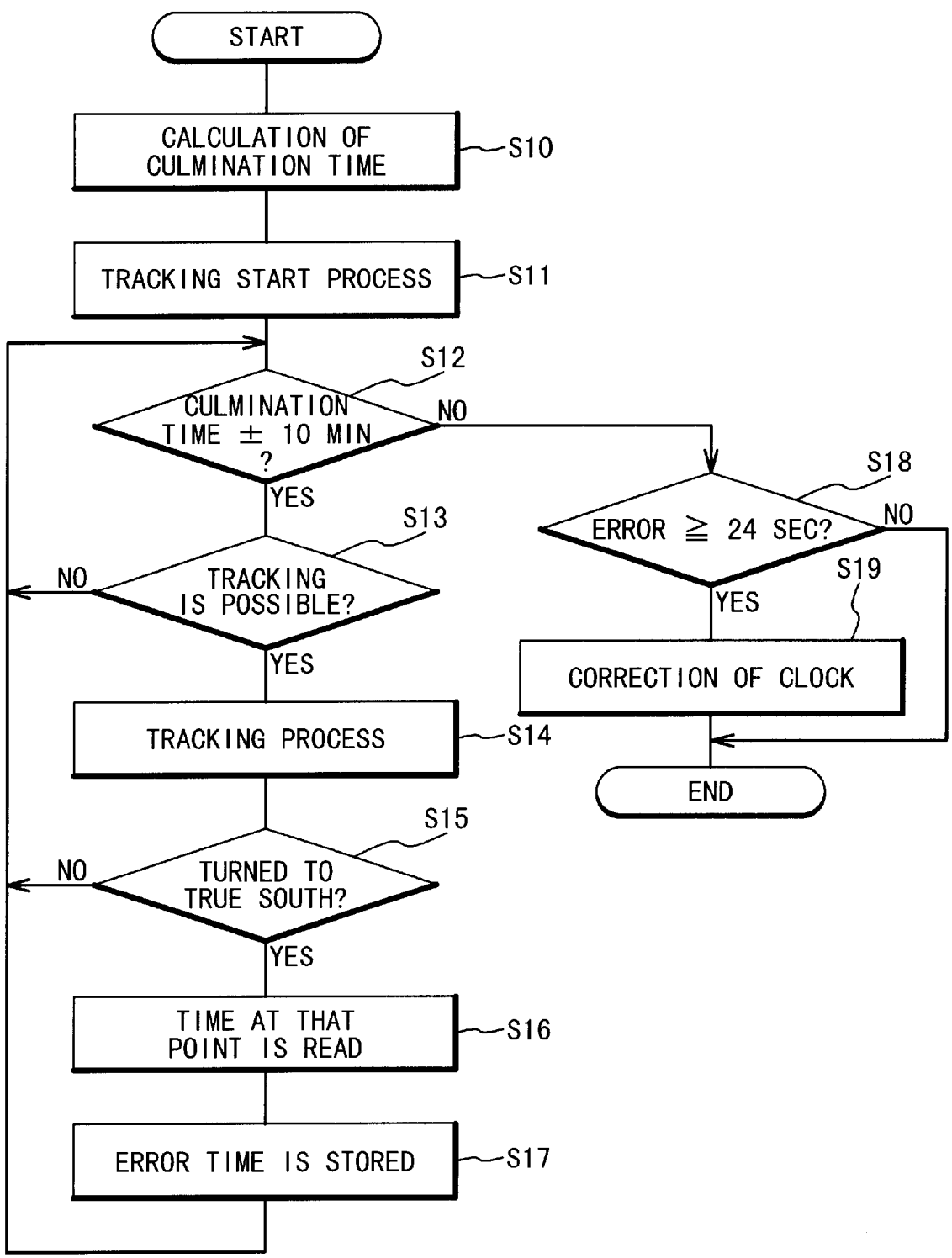
FIG. 5 is a flowchart showing a process for correcting an error in a tracking type photovoltaic power generator shown in FIG. 4.

A process for correcting an error of the time clocked by the clock 21 (hereafter, referred to as "error correction process") among the processes executed by the controller 20 will be described below with reference to a flowchart shown in FIG. 5. It should be noted that it is assumed that the data indicative of longitude and latitude of a position at which the tracking type photovoltaic power generator is installed is stored in the work memory of the controller 20 when installing the tracking type photovoltaic power generator.

In this error correction process, a culmination time is firstly calculated (Step S10). This calculation is carried out on the basis of a time indicated by the clock 21. Thus, when an error is included in the time indicated by the clock 21, the error is also included in the calculated culmination time. The thus-calculated culmination time is stored in the culmination time register.

Next, a tracking start process is carried out (Step S11). In this tracking start process, a sun direction at a time indicated by the clock 21 is calculated. Specifically, an elevation angle and an azimuth angle indicative of the sun direction are calculated. They are stored in the elevation angle register and the azimuth angle register, respectively.

After that, the tracking control signals are generated on the basis of the contents of the elevation angle register and the azimuth angle register, and sent to the motors 15, 17. Accordingly, the azimuth actuator 14 and the linear actuator 16 are driven. Thus, the power generation module 12 is rotated so as to face to the sun direction detected by the calculation.

Then, it is investigated whether or not a current time indicated by the clock 21 is present in a range of ten minutes before or after the culmination time stored in the culmination time register (Step S12). If it is judged to be present in the range of the 10 minutes before or after the culmination time, it is then investigated whether or not the tracking is possible (Step S13). This investigation is carried out by measuring whether or not an illumination of a certain value or more can be obtained for a certain period, by using an illumination meter (not shown). In this case, if the illumination of the certain value or more can not be obtained, for example, because of cloudy sky, or if the illumination of the certain value or more is only intermittently obtained since the sunlight is shielded by a mass of moving clouds, it is judged that the tracking is impossible.

It should be noted that, whether or not the tracking is possible can be judged by using another method. For example, it can be also judged by investigating whether or not an electric power of a certain value or more can be obtained from the power generation module 12, continuously for a certain period.

At the step S13, when it is so judged that the tracking is impossible, the sequence returns back to the step S12. On the other hand, when it is judged that the tracking is possible, the tracking process is carried out by using the sun direction sensor 18 (Step S14). That is, the contents of the elevation angle register and the azimuth angle register are updated on the basis of the signal from the sun direction sensor 18. After that, the tracking control signals are generated on the basis of the contents of the elevation angle register and the azimuth angle register, and sent to the motors 15, 17. Thus, the azimuth actuator 14 and the linear actuator 16 are driven. Hence, the power generation module 12 is rotated so as to face to the sun direction detected by the sun direction sensor 18.

Next, it is investigated whether or not the power generation module 12 is turned to a true south (Step S15). This is carried out by investigating whether or not the content of the azimuth angle register updated at the step S14 is data indicative of an azimuth angle of the true south (for example, zero).

At the step S15, if it is so judged that the power generation module 12 is not turned to the true south, the sequence returns back to the step S12. On the other hand, if it is judged that the power generation module 12 is turned to the true south, a time at that point is read from the clock 21 (Step S16). The time stored in the culmination time register is subtracted from the read time and stored as an error time in the error time register (Step S17). After that, the sequence returns back to the step S12. The operations similar to those of the above-mentioned description are repeatedly executed.

In the process of this repetition execution, if is judged at the step S12 that the current time indicated by the clock 21 is not present in the range of the 10 minutes before or after the culmination time, it is then investigated whether or not the error is 24 seconds or more (Step S18). In this Step S18, if it is judged to be 24 seconds or more, an error correction of the clock 21 is carried out (Step S19). That is, a time stored in the error time register is added to the time read from the clock 21, and its result is reset for the clock 21. If the error is less than 24 seconds at the step S18, the clock correction process is skipped. The error correction process is completed by the above-mentioned operations.

According to the above-mentioned embodiment of the present invention, the error of the time clocked by the built-in clock 21 is corrected at the predetermined time interval. Thus, the tracking type photovoltaic power generator is never at the state that the tracking is impossible. Therefore, the operation among long-range is possible. Also, it is possible to reduce a cost necessary for the correction of the error of the time clocked by the clock 21.

It should be noted that the above-mentioned embodiment is designed such that the error time is calculated if the current time indicated by the clock is present in the range of the 10 minutes before or after the culmination time. However, it is not limited to the 10 minutes before or after the culmination time. Any time may be used if it is in a range of an error time that can be varied by an accuracy of the clock 21 and an execution period of the error correction process.

Also, this is designed such that the clock correction is carried out only when the error is the 24 seconds or more. However, it is not limited to the 24 seconds. It can be defined as any predetermined time. In this case, the reason why the clock is corrected after waiting for the fact that the error exceeds a certain time is that a slight error may be brought about even if the sun direction sensor 18 is used to track the sun since the sun direction sensor 18 also has an error.

Moreover, the above-mentioned embodiment is designed such that the clock correction is carried out when the current time indicated by the clock 21 becomes outside the range of the 10 minutes before or after the culmination time. However, it can be designed such that the clock correction is carried out at another timing, for example at timing when a daily tracking operation is ended.

As detailed above, according to the present invention, it is possible to provide the tracking type photovoltaic power generator that can automatically correct the error of the time clocked by the clock, and the error correction method of its built-in clock.

What is claimed is:

1. A tracking photovoltaic power generator comprising:
   a clock which clocks a time;
   a sun direction sensor which outputs a signal indicative of a sun direction; and
   a controller which detects an error of a time clocked by the clock based on a signal from the sun direction sensor and corrects the error of the time clocked by said clock based on the signal from said sun direction sensor.

2. The tracking photovoltaic power generator according to claim 1, wherein said generator comprises only one said sun direction sensor.

3. A tracking photovoltaic power generator comprising:
   a clock which clocks a time;
   a sun direction sensor which outputs a signal indicative of a sun direction; and a controller which detects an error of a time clocked by the clock base on a signal from the sun direction sensor and corrects the error of the time clocked by said clock based on the signal from said sun direction sensor;

wherein said controller includes:

a calculating section which calculates a first time when the sun arrives at an azimuth based on the time clocked by said clock;

a detecting section which detects said azimuth based on the signal from said sun direction sensor; and a correction section which corrects the error of the time clocked by said clock based on a difference between a second time when said detecting section detects said azimuth and the first time calculated by said calculating section.

4. The tracking photovoltaic power generator according to claim 3, wherein said azimuth is a culmination azimuth of the sun relative to a location of the generator.

5. The tracking photovoltaic power generator according to claim 3, wherein said correcting section corrects the error of the time clocked by said clock when said difference becomes equal to or greater than a given value.

6. The tracking photovoltaic power generator according to claim 3, wherein said detecting section detects said azimuth based on the signal from said sun direction sensor within a given time period before or after the first time calculated by said calculating section.

7. The tracking photovoltaic power generator according to claim 6, wherein said correcting section corrects the error of the time clocked by said clock when said difference becomes equal to or greater than a given value.

8. The tracking photovoltaic power generator according to claim 6, wherein said correcting section corrects the error of the time clocked by said clock in a time band excluding said given time period.

9. The tracking photovoltaic power generator according to claim 8, wherein said correcting section corrects the error of the time clocked by said clock when said difference becomes equal to or greater than a given value.

10. An error correction method of a built-in clock in a tracking photovoltaic power generator comprising:

detecting an error of a time clocked by said built-in clock based on a signal from a sun direction sensor; and correcting the error of the time clocked by said built-in clock based on the detected error.

11. The error correction method of the built-in clock in a tracking photovoltaic power generator according to claim 10, wherein said generator comprises only one said sun direction sensor.

12. The error correction method of the built-in clock in a tracking photovoltaic power generator according to claim 10, wherein said detecting step comprises:

calculating a first time when the sun arrives at an azimuth based on the time clocked by said built-in clock, detecting said azimuth based on the signal from said sun direction sensor; and detecting the error of the time clocked by said built-in clock based on a difference between a second time when said azimuth is detected and said calculated first time.

13. The error correction method of the built-in clock in a tracking photovoltaic power generator according to claim 12, wherein said azimuth is a culmination aznimuth of the sun relative to a location of the generator.

14. The error correction method of the built-in clock in a tracing photovoltaic power generator according to claim 12, wherein said correcting step corrects the error of the time clocked by said built-in clock when said difference becomes equal to or greater than a given value.

\* \* \* \* \*

UNITED STATES PATENT AND TRADEMARK OFFICE
CERTIFICATE OF CORRECTION

PATENT NO.    : 6,465,725 B1
DATED         : October 15, 2002
INVENTOR(S)   : Masatoshi Shibata and Yukio Suzuki It is certified that error appears in the above-identified patent and that said Letters Patent is hereby corrected as shown below:

<u>Title page,</u>
Item [57], ABSTRACT,
Line 4, change "the sun the sun" to -- the sun --;
Line 6, change "basis of a" to -- basis of the --;
Line 7, before "difference" insert -- sun direction sensor, and then corrects an error of the time clocked by the clock on the basis of a --.

<u>Column 1,</u>
Lines 42-43, change "behind the sun" to -- behind a cloud --.

<u>Column 2,</u>
Line 49, change "6" to -- clocked by the clock when the difference becomes equal to or greater than a predetermined value --.

<u>Column 3,</u>
Line 48, change " "L" is " to -- "L'" is --.

<u>Column 6,</u>
Line 3, change "if is judged'." to -- if it is judged --.
Line 24, after "clock" insert -- 21 --.

<u>Column 7,</u>
Line 2, change "base" to -- based --.
Line 11, change "correction" to -- correcting --.

<u>Column 8,</u>
Line 19, after "clock" change the comma to a semicolon.
Line 28, change "aznimuth" to -- azimuth --.
Line 31, change "tracing" to -- tracking --.

Signed and Sealed this

Eighth Day of April, 2003

JAMES E. ROGAN
*Director of the United States Patent and Trademark Office*